UNITED STATES PATENT OFFICE.

WALTER P. JENNEY, OF NEW YORK, N. Y.

IMPROVEMENT IN VARNISH.

Specification forming part of Letters Patent No. 178,152, dated May 30, 1876; application filed January 6, 1876.

*To all whom it may concern:*

Be it known that I, WALTER P. JENNEY, of New York, in the county and State of New York, have invented a certain new and useful Varnish; and I do hereby declare that the following is a full and exact description thereof.

My invention consists in the production of a varnish from the resinous substance produced by the oxidation and treatment of sludge-oil, as fully set forth and described in an application for Letters Patent by me filed April 20, 1875, and now pending, and to which I refer for a more particular and detailed description of the manner of producing, and the peculiar characteristics of the aforesaid resinous substance.

My present invention consists in the production of a varnish from the aforesaid resinous substance by dissolving and mixing it, either with or without the aid of heat, with such solvents as will completely and perfectly dissolve the resinous substance and produce a useful varnish.

I have found by experience and trial that petroleum-naphtha readily dissolves the resinous substance, even without the aid of heat, producing an excellent varnish, which dries very quickly; that spirits of turpentine completely dissolves the resinous substance, especially when aided by heat, and produces a varnish useful for many purposes; that benzole and coal-tar naphtha also quickly dissolve the resinous substance, producing a varnish similar to the above; that linseed-oil, and other drying-oils, dissolve the resinous substance readily when aided by heat, forming slow-drying oil-varnishes; that a mixture of drying-oil and spirits of turpentine, or drying-oil and petroleum-naphtha, quickly dissolves the resinous substance, forming a more or less quickly-drying oil-varnish, as the proportions of the ingredients are changed.

In the manufacture of varnish from the resinous substance referred to the proportions of the resin, and of the different solvents, will be determined by the use to which the varnish is to be put, and the desired consistency of the resulting varnish.

By employing a greater or less quantity of solvents and oils the varnish can be made thick or thin, and also be made to dry with more or less rapidity.

I have found by experiment that a mixture in the following proportions makes an excellent varnish, drying very quickly: Resinous substance, one pound; petroleum-naphtha, one gallon; dissolve cold. Also, that a good oil-varnish may be made by the following mixture: Resinous substance, one pound and eight ounces; petroleum-naphtha, one gallon; linseed-oil, one pint; dissolve by the aid of a moderate heat.

For the petroleum-naphtha, one gallon oil turpentine may be substituted advantageously.

For waterproofing paper I find the following is best: Resinous substance, twelve ounces; oil turpentine, one gallon; dissolve by aid of moderate heat.

The varnish manufactured as above described may be distinguished from other varnishes by the following properties and characteristics: That on agitation of a sample of the varnish with half its bulk of concentrated sulphuric acid, the resinous substance is separated by the acid, and the solvent rises clear to the surface of the acid; by the appearance of a surface of wood or metal coated with this varnish, enabling a practiced eye to distinguish it from other varnishes; by the solubility of the varnish, after drying, in different chemical solvents, it is distinguished from all other varnishes whatsoever.

The varnish, after being evaporated to a hard residue, is soluble in ether, benzole, bisulphide of carbon, spirits of turpentine, petroleum, and coal-tar naphtha, chloroform, fusel-oil, olive-oil, linseed-oil, and mixtures of two parts ether and one part alcohol. It is scarcely dissolved by alcohol of ninety-five per cent., even on boiling, except in minute quantities, and may be considered to be insoluble in this solvent. Caustic alkalies have no effect upon it, even on heating, distinguishing it from many natural resins.

What I claim as a new invention, and desire to secure by Letters Patent, is—

The new varnish hereinabove described, and possessing the substantial properties herein described, and composed of the resinous substance produced by the oxidation of sludge-oil dissolved and incorporated with naphthas, or other suitable solvents and oils, as hereinabove described and set forth.

WALTER P. JENNEY.

Witnesses:
 PHILLIPS ABBOTT,
 BARON HIGHAM.